United States Patent
Ferrucci et al.

(10) Patent No.: US 8,738,362 B2
(45) Date of Patent: May 27, 2014

(54) EVIDENCE DIFFUSION AMONG CANDIDATE ANSWERS DURING QUESTION ANSWERING

(75) Inventors: David A. Ferrucci, Yorktown Heights, NY (US); David C. Gondek, Astoria, NY (US); Aditya A. Kalyanpur, Westwood, NJ (US); Adam P. Lally, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/243,805

(22) Filed: Sep. 23, 2011

(65) Prior Publication Data
US 2012/0078636 A1 Mar. 29, 2012

Related U.S. Application Data

(60) Provisional application No. 61/387,203, filed on Sep. 28, 2010.

(51) Int. Cl.
*G06F 17/30* (2006.01)

(52) U.S. Cl.
CPC .............................. *G06F 17/30654* (2013.01)
USPC .......................................................... 704/9

(58) Field of Classification Search
CPC .............................................. G06F 17/30654
USPC ..................................... 704/270, 9
See application file for complete search history.

(56) References Cited

U.S. PATENT DOCUMENTS

| | | | |
|---|---|---|---|
| 5,519,608 A * | 5/1996 | Kupiec | 704/9 |
| 5,634,051 A | 5/1997 | Thomson | |
| 5,794,050 A | 8/1998 | Dahlgren et al. | |
| 7,092,928 B1 | 8/2006 | Elad et al. | |
| 7,181,438 B1 | 2/2007 | Szabo | |
| 7,188,106 B2 * | 3/2007 | Dwork et al. | 1/1 |
| 7,558,778 B2 | 7/2009 | Carus et al. | |
| 7,590,606 B1 | 9/2009 | Keller et al. | |
| 7,783,620 B1 * | 8/2010 | Chevalier et al. | 707/706 |
| 7,783,630 B1 * | 8/2010 | Chevalier et al. | 707/723 |
| 8,392,410 B2 * | 3/2013 | Burges | 707/723 |
| 2001/0053968 A1 * | 12/2001 | Galitsky et al. | 704/9 |
| 2003/0037074 A1 * | 2/2003 | Dwork et al. | 707/500 |
| 2004/0064305 A1 * | 4/2004 | Sakai | 704/9 |
| 2004/0254917 A1 * | 12/2004 | Brill et al. | 707/3 |

(Continued)

OTHER PUBLICATIONS

Tiwari) "A Supervised Machine Learning Approach of Extracting Coexpression Relationship among Genes from Literature" IEEE IRI 2010, Aug. 4-6, 2010.*

(Continued)

*Primary Examiner* — Jialong He
(74) *Attorney, Agent, or Firm* — Scully, Scott, Murphy & Presser, P.C.; William Stock, Esq.

(57) ABSTRACT

Diffusing evidence among candidate answers during question answering may identify a relationship between a first candidate answer and a second candidate answer, wherein the candidate answers are generated by a question-answering computer process, the candidate answers have associated supporting evidence, and the candidate answers have associated confidence scores. All or some of the evidence may be transferred from the first candidate answer to the second candidate answer based on the identified relationship. A new confidence score may be computed for the second candidate answer based on the transferred evidence.

8 Claims, 4 Drawing Sheets

(56) References Cited

U.S. PATENT DOCUMENTS

| | | | |
|---|---|---|---|
| 2005/0086045 A1 | 4/2005 | Murata | |
| 2005/0114327 A1* | 5/2005 | Kumamoto et al. | 707/3 |
| 2005/0256700 A1* | 11/2005 | Moldovan et al. | 704/9 |
| 2005/0289168 A1 | 12/2005 | Green et al. | |
| 2006/0053000 A1 | 3/2006 | Moldovan et al. | |
| 2006/0112045 A1* | 5/2006 | Talbot et al. | 706/46 |
| 2006/0206472 A1* | 9/2006 | Masuichi et al. | 707/4 |
| 2006/0224379 A1 | 10/2006 | Ejerhed | |
| 2006/0235689 A1* | 10/2006 | Sugihara et al. | 704/257 |
| 2007/0136246 A1 | 6/2007 | Stenchikova et al. | |
| 2009/0192966 A1 | 7/2009 | Horvitz et al. | |
| 2009/0259642 A1 | 10/2009 | Cao et al. | |
| 2009/0287678 A1* | 11/2009 | Brown et al. | 707/5 |
| 2009/0292687 A1* | 11/2009 | Fan et al. | 707/5 |
| 2010/0100546 A1 | 4/2010 | Kohler | |
| 2011/0060584 A1* | 3/2011 | Ferrucci et al. | 704/9 |
| 2011/0066587 A1* | 3/2011 | Ferrucci et al. | 706/54 |

OTHER PUBLICATIONS

Sullivan "Google Now Searching for Synonyms" Aug. 26, 2008 at 4:54pm ET.*

Ferrucci et al. "Building Watson: An Overview of the DeepQA Project", Association for the Advancement of Artificial Intelligence, 2010.*

Ko et al. "A Probabilistic Graphical Model for Joint Answer Ranking in Question Answering", SIGIR'07, Jul. 23-27, 2007, Amsterdam, The Netherlands.*

Carroll et al. "A Multi-Strategy and Multi-Source Approach to Question Answering", IBM Thomas J Watson Research Center Yorktown Heights NY, 2006.*

Nyberg et al. "The JAVELIN Question-Answering System at TREC 2002", Computer Science Department. Paper 322, [online], http://repository.cmu.edu/compsci/322, published in 2002.*

Wolpert, Stacked Generalization, Neural Networks, 1992, pp. 241-259, 5(2).

Miller, WordNet: A Lexical Database for English, Communications of the ACM, 1995, pp. 39-41, 38(11).

Paritosh et al., Analysis of Strategic Knowledge in Back of the Envelope Reasoning, In Proceedings of the 20th AAAI Conference on Artificial Intelligence (AAAI-05), 2005, Menlo Park, CA: AAAI Pr.

Lenat, Cyc: A Large-Scale Investment in Knowledge Infrastructure, Communications of the ACM, 1995, pp. 33-38, 38(11).

Herbrich et al., Large Margin Rank Boundaries for Ordinal Regression, In Advances in Large Margin Classifiers, 2002, pp. 115-132. Linköping, Sweden: Liu E-Press.

Dredze, Confidence-Weighted Linear Classification. In Proceedings of the Twenty-Fifth International Conference on Machine Learning (ICML). Princeton, NJ: International Machine Learning Society, 2008.

Jacobs et al., Adaptive Mixtures of Local Experts. Neural Computation, 1991, pp. 79-87, 3(1).

Joachims, Optimizing Search Engines Using Clickthrough Data. In Proceedings of the Thirteenth ACM Conference on Knowledge Discovery and Data Mining (KDD). New York: Association for Computing Machinery, 2002.

Smith et al., Identification of Common Molecular Subsequences. Journal of Molecular Biology, 1981, pp. 195-197, 147(1).

Hermjakob et al., Knowledge-Based Question Answering. In Proceedings of the Sixth World Multiconference on Systems, Cybernetics, and Informatics (SCI-2002). Winter Garden, FL: International Institute of Informatics and Systemics, 2000.

Ko et al., A Probabilistic Graphical Model for Joint Answer Ranking in Question Answering. In Proceedings of the 30th Annual International ACM SIGIR Conference, 2007, 343-350. New York: Association for Computing Machinery.

Mccord et al., A System for Simpler Construction of Practical Natural Language Grammars. In Natural Language and Logic: International Scientific Symposium. Lecture Notes in Computer Science 459. Berlin: Springer Verlag, 1990 (Abstract only).

International Search Report mailed Feb. 7, 2012 in corresponding International Patent Application No. PCT/US2011/053049.

Chu-Carroll et al, "In Question-Answering, Two Heads are Better than One", HLT-NAACL'03, May-Jun. 2003, pp. 24-31, Edmonton, Canada.

Ferrucci et al., "Towards the Open Advancement of Question Answering Systems." IBM Technical Report RC24789, Computer Science, Apr. 22, 2009.

Moldovan et al., "COGEX: A Logic Prover for Question Answering." Proceedings of HLT-NAACL 2003, May-Jun. 2003, pp. 87-93, Edmonton.

Simmons, "Natural Language Question-Answering Systems: 1969." Communications of the ACM, Jan. 1970, pp. 15-30, 13(1).

Voorhees et al., "Overview of the TREC 2005 Question Answering Track." In Proceedings of the Fourteenth Text Retrieval Conference, 2005, Gaithersburg, Maryland.

Weinstein et al., Agents Swarming in Semantic Spaces to Corroborate Hypotheses, AAMAS'04, Jul. 19-23, 2004, New York, New York, USA, Copyright 2004 ACM 1-58113-864-4/04/0007.

Prager et al., "A Multi-Strategy, Multi-Question Approach to Question Answering." In New Directions in Question-Answering, Maybury, M. (Ed.), AAAI Press, 2004.

Strzalkowski et al. "Advances in Open-Domain Question-Answering," Springer, 2006 (background information only—the front cover, copyright page and table of contents only).

Balahur, "Going Beyond Traditional QA Systems: Challenges and Keys in Opinions Question Answering," Coling 2010: Poster Volume, pp. 27-35, Beijing, Aug. 2010.

Blitzer, Domain Adaptation of Natural Language Processing Systems, Presented to the Faculties of the University of Pennsylvania in Partial Fulfillment of the Requirements for the Degree of Doctor of Philosophy, 2007.

University of Illinois at Urbana-Champaign, Department of Computer Science, Research, 2010 http://cs.illinois.edu/research?report=UIUCDCS-R-2008-2974.

National Center for Biotechnology Information (NCBI), Entrez the Life Sciences Search Engine, Oct. 28, 2009.

Chang et al., "Creating an Online Dictionary of Abbreviations from MEDLINE," J Am Med Inform Assoc. 2002; 9:612-620. DOI 10.1197/jamia.M1139.

Adar, "SaRAD: a Simple and Robust Abbreviation Dictionary," Bioinformatics, Mar. 2004, pp. 527-33, vol. 20 Issue 4.

* cited by examiner

US 8,738,362 B2

EVIDENCE DIFFUSION AMONG CANDIDATE ANSWERS DURING QUESTION ANSWERING

CROSS-REFERENCE TO RELATED APPLICATIONS

This application claims the benefit of U.S. Provisional Application No. 61/387,203, filed on Sep. 28, 2010, which is incorporated herein by reference in its entirety.

FIELD OF THE INVENTION

The present application relates generally to computers, and computer applications, and more particularly to artificial intelligence and natural language processing.

BACKGROUND OF THE INVENTION

With a wealth of enterprise-critical information being captured in natural language documentation of all forms, the problems with perusing only the top 10 or 20 most popular documents containing the user's two or three key words are becoming increasingly apparent. This is especially the case in the enterprise where popularity is not as important an indicator of relevance. The inventors in the present disclosure have recognized that enterprise computer systems should deeply analyze the breadth of relevant content to more precisely answer and justify answers to user's natural language questions. An open-domain Question Answering (QA) problem is one of the most challenging in the realm of computer science and artificial intelligence, requiring a synthesis of information retrieval, natural language processing, knowledge representation and reasoning, machine learning, and computer-human interfaces.

QA systems typically generate several potential candidate answers to a given question and use various algorithms to rank and score candidates based on their evidence. However, QA systems typically consider candidate answers independent of each other, and seldom, if ever, explore relationships among the candidates themselves.

BRIEF SUMMARY

A method and system for diffusing evidence among candidate answers during question answering may be provided. The method, in one aspect, may include identifying a relationship between a first candidate answer and a second candidate answer, wherein the candidate answers are generated by a question-answering computer process, the candidate answers have associated supporting evidence, and the candidate answers have associated confidence scores. The method may also include transferring all or some of the evidence from the first candidate answer to the second candidate answer based on the identified relationship. The method may further include computing a new confidence score for the second candidate answer based on the transferred evidence.

A system for diffusing evidence among candidate answers during question answering, in one aspect, may include an evidence diffusion module operable to identify a relationship between a first candidate answer and a second candidate answer, wherein the candidate answers are generated by a question-answering computer process, the candidate answers have associated supporting evidence, and the candidate answers have associated confidence scores, the evidence diffusion module may be further operable to transfer all or some of the evidence from the first candidate answer to the second candidate answer based on the identified relationship. The evidence diffusion module may be also operable to compute a new confidence score for the second candidate answer based on the transferred evidence.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

An example of a question answering (QA) system is described in U.S. Patent Publication No. 20110066587 A1. In one embodiment of the present disclosure, a methodology and/or system may be presented that examine links and/or relationships among the candidate answers. The candidate answers, for instance, may have been determined automatically by a QA system or methodology. The methodology and/or system of the present disclosure may use this information to determine the correct answer. Once relationships among candidate answers have been identified, the methodology and/or system of the present disclosure in one embodiment may transfer evidence between the candidates and use this information to re-rank the candidates.

For example, consider the following questions:

a. If you land in ABC International Airport, you land in this country. (Correct Answer: XYZ)

The airport mentioned in the question is located in the city X, which is in country XYZ. As a result, there may be a lot of textual evidence for city X, which can overwhelm the type-based evidence for the country XYZ, causing the QA system to answer with X even though it is of the wrong type. That is, X is of city type while XYZ is of country type; and the answer should be a name of a country, since the question asked for a country rather than a city.

To solve the above problem, a methodology and/or system of the present disclosure in one embodiment may identify one or more relationships between the candidate answers, e.g., X and XYZ. An identified relationship may be "capital of", "located in", and others. For instance, X is the capital of XYZ, X is located in XYZ, or any other relationships that may be identified. Based on this information, evidence from an incorrectly typed candidate may be transferred to the correctly typed candidate, thus boosting the confidence score on the correct answer.

Figure 1:
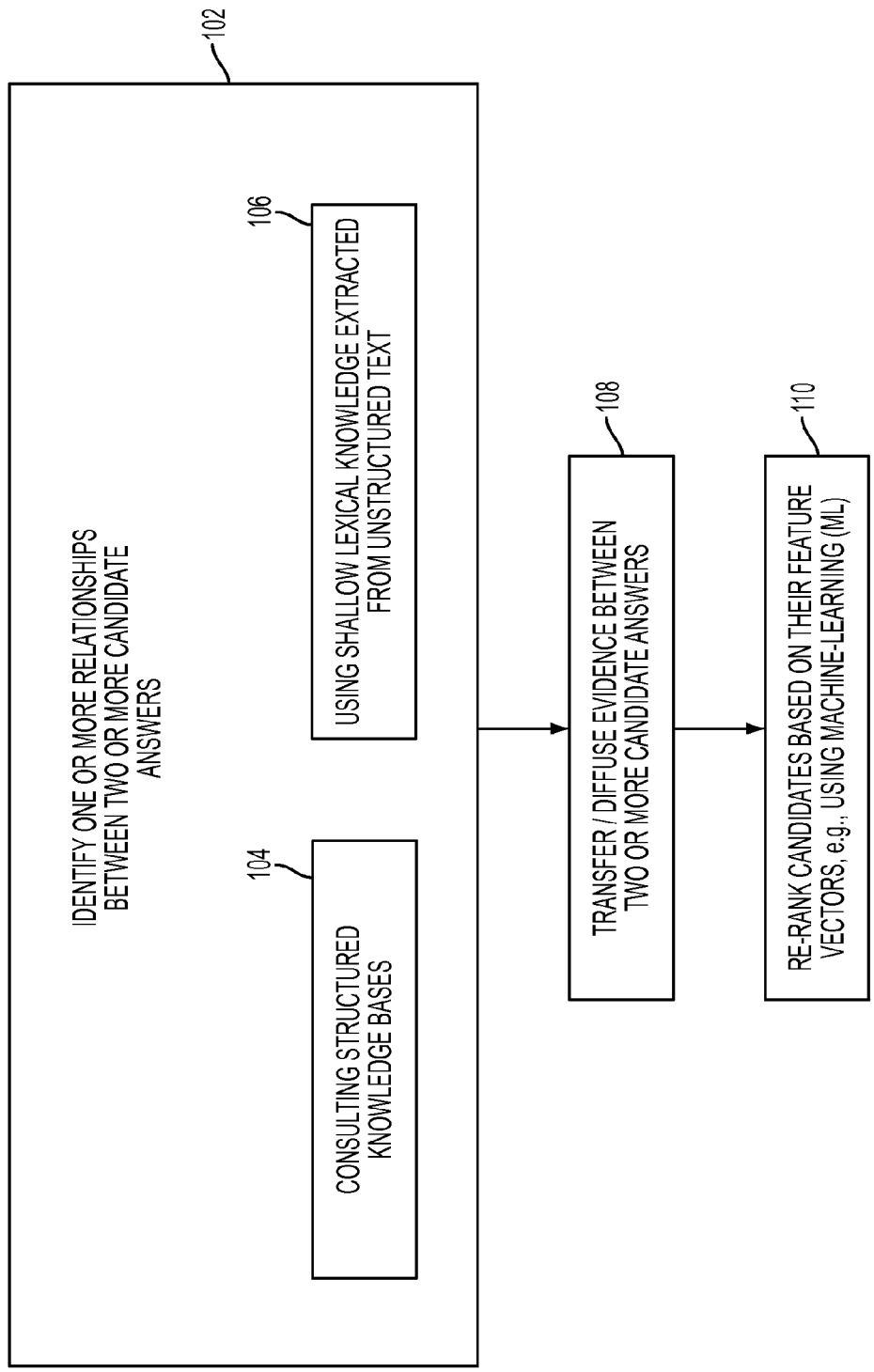
FIG. 1 is a flow diagram illustrating a method of the present disclosure in one embodiment.

FIG. 1 is a flow diagram illustrating a method of the present disclosure in one embodiment. At 102, one or more relationships between two or more candidate answers, for instance, generated automatically by a QA system, are identified.

Identifying relationships between the candidate answers may include consulting structured knowledge bases at 104. This may include mapping the candidate answers. For instance, referring to the above example, this may include mapping the entity strings "X" and "XYZ" to corresponding resources in a structured knowledge base, which itself is a non-trivial disambiguation task. For instance, "X" may be also the name of some other entity, e.g., a comic, a restaurant chain, etc, and the system and/or methodology of the present disclosure in one embodiment may look at the larger context (such as a supporting passage containing the candidate answer) to determine the correct sense of the entity.

Another way to identify relationships may be by using shallow lexical knowledge extracted from unstructured text at 106, for instance, utilizing one or more ontologies. For instance, the system and/or methodology of the present disclosure may look for textual phrases and/or relations that link the entities X and XYZ in a large text corpus (e.g., "capital of", "largest city in", etc.) and sort phrases based on their frequency to get the most popular relations. Other methods may be utilized to identify relationships between the candidate answers.

At 108, the question may be analyzed, considering answer-type information and relations between entities in the clue and the answer, to determine which direction to transfer or diffuse evidence among candidates. Using the above example for explanation purposes only, since the question is asking for a country, and airports are located in cities, the methodology of the present disclosure may transfer evidence from the city where the airport is located to the corresponding country.

The methodology of the present disclosure in one embodiment may diffuse or transfer evidence from the candidate X to XYZ based on the relationships found at 106 and the analysis done at 108. Evidence diffusion may be performed in several ways. For instance, evidence diffusion may be done by transferring feature scores across candidates. For example, one of the features computed for a candidate answer may be "Passage-Text-Evidence". Given a question and a candidate answer, the methodology of the present disclosure in one embodiment measures how much passage text evidence can be found that supports the candidate answer being an answer to the question. This feature score may be a numerical value—higher the score, stronger the text evidence for the candidate. If a pair of candidate answers, C1, C2, has been identified for evidence diffusion, a feature score may be "transferred"—in the above example, the "Passage-Text-Evidence" score—from one candidate (e.g., C1) to another (e.g., C2). "Transfer" of the feature score can be done in several ways, e.g., the higher feature score on C1 can simply override the corresponding feature score on C2; or the feature score from C1 can be added to the corresponding score on C2. Other "transferring" of the feature score may be possible.

A subset of the features that are appropriate in the context of the clue may be transferred. In the above example, it does not make sense to transfer type-match feature scores from X to XYZ, but mainly location-specific features. The methodology of the present disclosure may also use heuristics to determine whether to transfer the entire feature score as-is, or some fraction of the score based on the type and strength of the relationships found between the candidates. For example, there may be a strong geographical relation between X and XYZ which makes a stronger case for diffusion, in which case the entire feature score may be transferred.

Another way to diffuse or transfer evidence from one candidate answer to another may be adding new features on candidates to indicate that evidence diffusion has been done, with the feature score based on the amount of diffusion. This may be illustrated using the above example. Continuing with the above example, in addition to the feature "Passage-Text-Evidence", another feature may be created, called "Transferred-Passage-Text-Evidence" for each candidate. Then, in evidence diffusion process, the methodology of the present disclosure may use the latter feature to score how much evidence was transferred (e.g., instead of copying the score to the former feature as described above). For example, suppose the two candidates have the feature-scores:

Before Evidence Diffusion:

| Candidate | Passage-Text-Evidence | Transferred-Passage-Text-Evidence |
| --- | --- | --- |
| X | 20 | 0 |
| XYZ | 10 | 0 |

After Evidence Diffusion (from X to XYZ):

| Candidate | Passage-Text-Evidence | Transferred-Passage-Text-Evidence |
| --- | --- | --- |
| X | 20 | 0 |
| XYZ | 10 | 20 |

Now the machine learning system can learn a separate weight on the new feature "Transferred-Passage-Text Evidence".

At 110, the methodology of the present disclosure in one embodiment may calculate a new confidence score for XYZ and re-rank candidates based on their feature vectors, for instance, using machine-learning (ML).

Evidence diffusion enables the ML to lend more weight to candidate answers that have received additional evidence (e.g., via transferred or new feature scores) from other candidates. In the above example, this allows the QA system to correctly answer with XYZ, by transferring evidence from X, the city where the airport in question is located.

Figure 2:
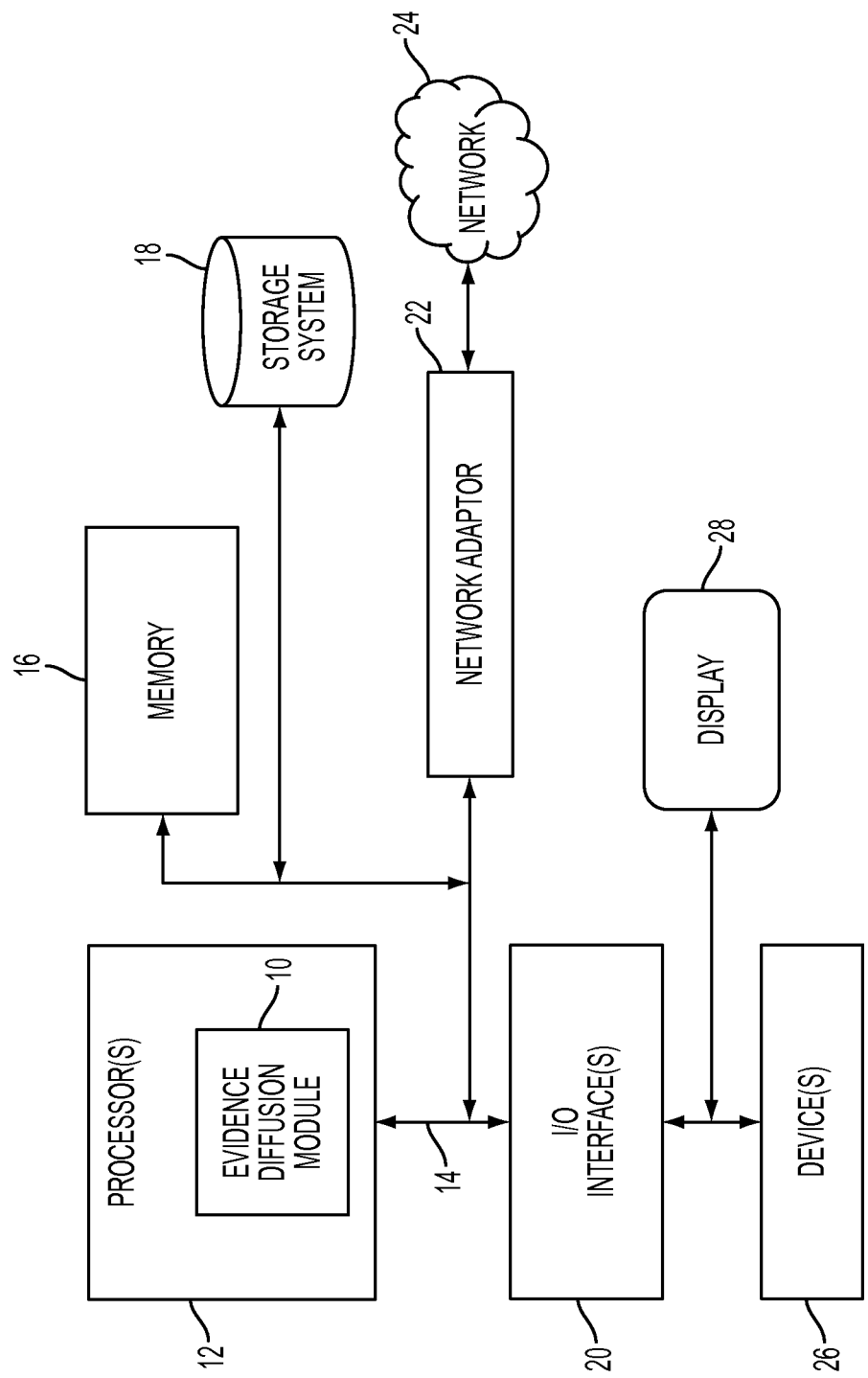
FIG. 2 illustrates a schematic of an example computer or processing system that may implement an evidence diffusion system in one embodiment of the present disclosure.

FIG. 2 illustrates a schematic of an example computer or processing system that may implement an evidence diffusion system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an evidence diffusion module 10 that performs the evidence diffusion described herein. The evidence diffusion module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20. The evidence diffusion, for example, may be presented on the display device 28. For instance, the evidence diffusion module 10 may include visualization logic for generating the visualization or enabling the generation of the visualization, which visualization may be presented on the display device 28.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Figure 3:
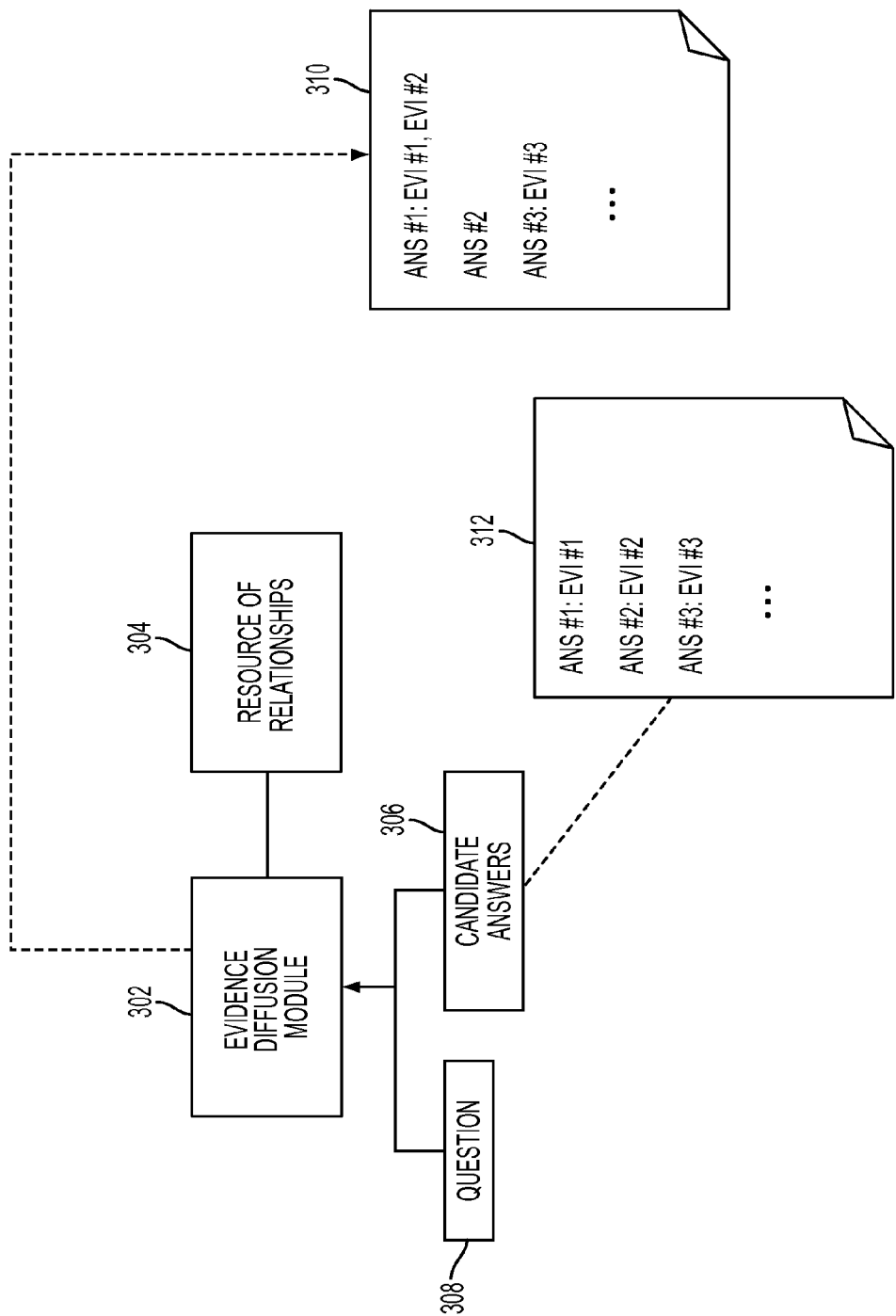
FIG. 3 is a block diagram showing functional components or modules for evidence diffusion in one embodiment of the present disclosure.

FIG. 3 is a block diagram showing functional components or modules for evidence diffusion in one embodiment of the present disclosure. A resource of relationships among named entities 304 may be analyzed, for example, by an evidence diffusion module 302. The analysis identifies, in one embodiment, the relationships among a set of candidate answers 306. The candidate answers 306 having been identified as being potential answers to a question 308. The set of candidate answers 306 may include answers and supporting evidence. Based on the relationships among the candidate answers, the evidence may be transferred from one set of candidates to another set. An example is shown at 310, in which the evidence from candidate answer #2 is transferred to candidate answer #1. Optionally, the question may be analyzed to determine directionality of transfer.

For example, consider the questions below:
1. In the category of fictional characters: Title hero whose Boarding School's motto is "Draco dormiens nunquam titillandus", "never tickle a sleeping dragon". In this case, the methodology of the present disclosure in one embodiment may transfer evidence from the "Boarding School" (Hogwarts) to the "Title Hero" (Harry Potter) since the question is asking for the hero.
2. In the category of world leaders: In 1984 his grandson succeeded his daughter to become his country's prime minister. In this case, the methodology of the present disclosure in one embodiment may transfer evidence from "his grandson" (Rajiv Gandhi), "his daughter" (Indira Gandhi) and "his country" (India) to the focus of the question "his" (Nehru), which is the correct answer.

Given the wording of the question and the different ways a question may be posed, the methodology of the present disclosure in one embodiment may correctly analyze and parse the sentence to determine what the direction of diffusion is between the various terms.

As part of the transfer evidence, existing evidence information on candidates may be transferred, and/or new evidence information may be added indicating the strength and/or directionality of the relation.

QA systems referred to in the present disclosure may be computer systems that deeply analyze the breadth of relevant content to more precisely answer and justify answers to user's natural language questions. The methodologies disclosed herein may be used to further enhance the QA systems. Such QA systems may help support professionals in decision making in areas like compliance, health care, business integrity, business intelligence, knowledge discovery, enterprise knowledge management, security, customer support, and others.

QA systems may be implemented using a synthesis of information retrieval, natural language processing, knowledge representation and reasoning, machine learning, and computer-human interfaces. Technologies including parsing, question classification, question decomposition, automatic source acquisition and evaluation, entity and relation detection, logical form generation, and knowledge representation and reasoning may be incorporated.

Figure 4:
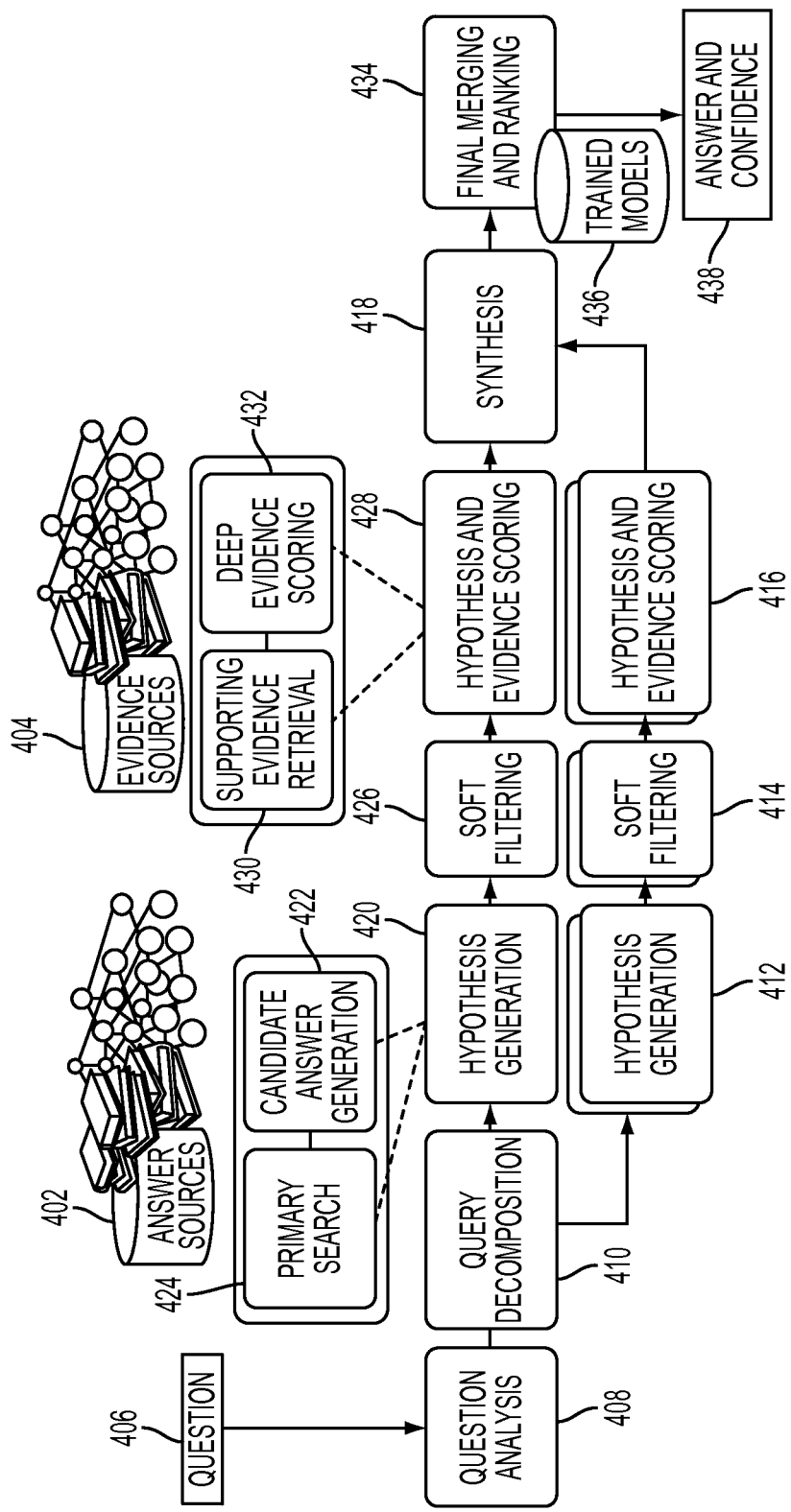
FIG. 4 illustrates high-level architecture of a QA system in one embodiment of the present disclosure.

FIG. 4 illustrates high-level architecture of a QA system.
Content Acquisition
To solve a QA problem, a QA system may acquire content (also referred to as a corpus) or identify and gather the content to use for the answer sources 402 and evidence sources 404. Content acquisition may be a combination of manual and automatic steps. Example questions may be analyzed from the problem space to produce a description of the kinds of questions that must be answered and a characterization of the application domain. Analyzing example questions may involve a manual task, while domain analysis may be informed by automatic or statistical analyses, such as the lexical answer type (LAT) analysis. A LAT indicates the type of answer that the question is looking for. The sources 402 and 404 may include a wide range of encyclopedias, dictionaries, thesauri, newswire articles, literary works, and so on.

Given a reasonable baseline corpus, the QA system may then apply an automatic corpus expansion process. The process may involves four high-level steps: (1) identify seed documents and retrieve related documents from the web; (2) extract self-contained text nuggets from the related web documents; (3) score the nuggets based on whether they are informative with respect to the original seed document; and (4) merge the most informative nuggets into the expanded corpus. A QA methodology may use this expanded corpus in real time, e.g., without needing to have access to other sources such as the World Wide Web (web).

In addition to the content for the answer and evidence sources, the QA system may leverage other kinds of semistructured and structured content. Another step in the content-acquisition process is to identify and collect these resources, which may include databases, taxonomies, and ontologies, such as dbPedia, 7 WordNet, and the Yago8 ontology. (Miller, G. A. 1995. WordNet: A Lexical Database for English. Communications of the ACM 38(11): 39-41).

Question Analysis

A run-time question-answering process includes question analysis 408, which analyzes a question 406. During question analysis 408, the system attempts to understand what the question is asking and performs the initial analyses that determine how the question will be processed by the rest of the system. The QA approach encourages a mixture of experts at this stage, and may produce shallow parses, deep parses, logical forms, semantic role labels, coreference, relations, named entities, and so on, as well as specific kinds of analysis for question answering. (McCord, M. C. 1990. Slot Grammar: A System for Simpler Construction of Practical Natural Language Grammars. In Natural Language and Logic: International Scientific Symposium. Lecture Notes in Computer Science 459. Berlin: Springer Verlag).

Question classification refers to the task of identifying question types or parts of questions that require special processing. This can include anything from single words with potentially double meanings to entire clauses that have certain syntactic, semantic, or rhetorical functionality that may inform downstream components with their analysis. Question classification may identify a question as a puzzle question, a math question, a definition question, and so on. It may identify puns, constraints, definition components, or entire subdues within questions.

Focus and LAT Detection.

A lexical answer type is a word or noun phrase in the question that specifies the type of the answer without any attempt to understand its semantics. Determining whether or not a candidate answer can be considered an instance of the LAT is an important kind of scoring and a common source of critical errors. A QA system may exploit many independently developed answer-typing algorithms. However, many of these algorithms are dependent on their own type systems. We found the best way to integrate preexisting components is not to force them into a single, common type system, but to have them map from the LAT to their own internal types. The focus of the question is the part of the question that, if replaced by the answer, makes the question a stand-alone statement. For example, consider the following example questions. The focus of "When hit by electrons, a phosphor gives off electromagnetic energy in this form" is "this form"; the focus of "Secretary Chase just submitted this to me for the third time; guess what, pal. This time I'm accepting it" is the first "this"; and the focus of "This title character was the crusty and tough city editor of the Los Angeles Tribune" is "This title character." The focus often (but not always) contains useful information about the answer, is often the subject or object of a relation in the clue, and can turn a question into a factual statement when replaced with a candidate, which is a useful way to gather evidence about a candidate.

Relation Detection

Most questions contain relations, whether they are syntactic subject-verb object predicates or semantic relationships between entities. For example, in the question, "They're the two states you could be reentering if you're crossing Florida's northern border," the relation borders (Florida,?x,north) may be detected. Relation detection may be used throughout the QA process, from focus and LAT determination, to passage and answer scoring. Detected relations may be also used to query a triple store (or another database) and directly generate candidate answers.

Decomposition

In one aspect, questions may be handled through query decomposition 410. A QA system may use rule-based deep parsing and statistical classification methods both to recognize whether questions should be decomposed and to determine how best to break them up into subquestions. The operating hypothesis in this aspect is that the correct question interpretation and derived answer(s) will score higher after all the collected evidence and all the relevant algorithms have been considered. Even if the question did not need to be decomposed to determine an answer, this method can help improve the system's overall answer confidence. A QA system may solve parallel decomposable questions through application of the end-to-end QA system on each subdue and synthesizes the final answers by a customizable answer combination component. These processing paths are at 412, 414, 416 and 418. A QA system may also support nested decomposable questions through recursive application of the end-to-end QA system to the inner subdue and then to the outer subdue. The customizable synthesis components allow specialized synthesis algorithms to be easily plugged into a common framework.

Hypothesis Generation

Hypothesis generation 420 takes the results of question analysis 408 and produces candidate answers 422 by searching the system's sources 402 and extracting answer-sized snippets from the search results. Each candidate answer plugged back into the question is considered a hypothesis, which the system has to prove correct with some degree of confidence.

In the present disclosure in one embodiment, search performed in hypothesis generation is referred to as "primary search" 424 to distinguish it from search performed during evidence gathering (described below). In one embodiment, a QA system may use a mixture of different approaches for primary search 422 and candidate generation.

Primary Search

In primary search, the system of the present disclosure in one embodiment attempts to find as much potentially answer-bearing content as possible based on the results of question analysis. The focus may be on recall with the expectation that the host of deeper content analytics will extract answer candidates and score this content plus whatever evidence can be found in support or refutation of candidates to drive up the precision. A variety of search techniques may be used, for example, including the use of multiple text search engines with different underlying approaches (for example, Indri and Lucene), document search as well as passage search, knowledge base search using SPARQL (Resource Description Framework (RDF) query language) on triple stores, the generation of multiple search queries for a single question, and backfilling hit lists to satisfy key constraints identified in the question.

Triple store (or another database) queries in primary search 424 may be based on named entities in the clue; for example, find all database entities related to the clue entities, or based on more focused queries in the cases that a semantic relation is detected. For a number of LATs, the candidate answer can be generated from a fixed list in some store of known instances of the LAT, such as "U.S. President" or "Country."

Candidate Answer Generation

The search results feed into candidate generation 422, where techniques appropriate to the kind of search results are applied to generate candidate answers. For document search results from "title-oriented" resources, the title is extracted as a candidate answer. The system may generate a number of candidate answer variants from the same title based on substring analysis or link analysis (if the underlying source contains hyperlinks). Passage search results may involve more detailed analysis of the passage text to identify candidate answers. For example, named entity detection may be used to extract candidate answers from the passage. Some sources, such as a triple store and reverse dictionary lookup, produce candidate answers directly as their search result.

If the correct answer(s) are not generated at this stage as a candidate, the system may conclude that the question cannot be answered. This step therefore may favor recall over precision, with the expectation that the rest of the processing pipeline will tease out the correct answer, even if the set of candidates is quite large. The system may therefore, tolerate noise in the early stages of the pipeline and drive up precision downstream. At this stage, there may be a large number of candidate answers, for instance the QA system may generate several hundred candidate answers.

Soft Filtering

A step in managing the resource versus precision trade-off may be the application of lightweight (less resource intensive) scoring algorithms to a larger set of initial candidates to prune them down to a smaller set of candidates before the more intensive scoring components see them. For example, a lightweight scorer may compute the likelihood of a candidate answer being an instance of the LAT. This step is referred to as soft filtering 426 in the present disclosure.

A QA system may combine these lightweight analysis scores into a soft filtering score. Candidate answers that pass the soft filtering threshold proceed to hypothesis and evidence scoring, while those candidates that do not pass the filtering threshold are routed directly to the final merging stage. The soft filtering scoring model and filtering threshold may be determined based on machine learning over training data. For instance, the QA system may let roughly 100 candidates pass the soft filter, but this a parameterizable function.

Hypothesis and Evidence Scoring

Candidate answers that pass the soft filtering threshold undergo a rigorous evaluation process 428 that involves gathering additional supporting evidence for each candidate answer, or hypothesis, and applying a wide variety of deep scoring analytics to evaluate the supporting evidence.

Evidence Retrieval

To better evaluate each candidate answer that passes the soft filter, the system in one embodiment gathers additional supporting evidence 430. The architecture may support the integration of a variety of evidence-gathering techniques. An example technique is passage search where the candidate answer is added as a required term to the primary search query derived from the question. This will retrieve passages that contain the candidate answer used in the context of the original question terms. Supporting evidence may also come from other sources like triple stores. The retrieved supporting evidence is routed to the deep evidence scoring components 432, which evaluate the candidate answer in the context of the supporting evidence.

Scoring

The scoring step is where the bulk of the deep content analysis is performed. Scoring algorithms determine the degree of certainty that retrieved evidence supports the candidate answers. The QA framework of the present disclosure in one embodiment supports and encourages the inclusion of many different components, or scorers, that consider different dimensions of the evidence and produce a score that corresponds to how well evidence supports a candidate answer for a given question.

The QA system in one embodiment of the present disclosure provides a common format for the scorers to register hypotheses (for example candidate answers) and confidence scores, while imposing few restrictions on the semantics of the scores themselves; this enables QA developers to rapidly deploy, mix, and tune components to support each other. For example, the QA system may employ more than 50 scoring components that produce scores ranging from formal probabilities to counts to categorical features, based on evidence from different types of sources, e.g., including unstructured text, semi-structured text, and triple stores. These scorers consider things like the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), its aliases, and so on.

Consider the question, "He was presidentially pardoned on Sep. 8, 1974"; the correct answer, "Nixon," is one of the generated candidates. One of the retrieved passages is "Ford pardoned Nixon on Sep. 8, 1974." One passage scorer counts the number of IDF-weighted terms in common between the question and the passage. Another passage scorer based on the Smith-Waterman sequence-matching algorithm (Smith T. F., and Waterman M. S. 1981. Identification of Common Molecular Subsequences. Journal of Molecular Biology 147 (1): 195-197.), measures the lengths of the longest similar subsequences between the question and passage (for example "on Sep. 8, 1974"). A third type of passage scoring measures the alignment of the logical forms of the question and passage. A logical form is a graphical abstraction of text in which nodes are terms in the text and edges represent either grammatical relationships (for example, Hermjakob, U.; Hovy, E. H.; and Lin, C. 2000. Knowledge-Based Question Answering. In Proceedings of the Sixth World Multiconference on Systems, Cybernetics, and Informatics (SCI-2002). Winter Garden, Fla.: International Institute of Informatics and Systemics; Moldovan, D.; Clark, C.; Harabagiu, S.; and Maiorano, S. 2003. COGEX: A Logic Prover for Question Answering. Paper presented at the Human Language Technology Conference, Edmonton, Canada, 27 May-1 June), deep semantic relationships (for example, Lenat, D. B. 1995. Cyc:

A Large-Scale Investment in Knowledge Infrastructure. Communications of the ACM 38(11): 33-38; Paritosh, P., and Forbus, K. 2005. Analysis of Strategic Knowledge in Back of the Envelope Reasoning. In Proceedings of the 20th AAAI Conference on Artificial Intelligence (AAAI-05). Menlo Park, Calif.: AAAI Press.), or both. The logical form alignment identifies Nixon as the object of the pardoning in the passage, and that the question is asking for the object of a pardoning. Logical form alignment gives "Nixon" a good score given this evidence. In contrast, a candidate answer like "Ford" would receive near identical scores to "Nixon" for term matching and passage alignment with this passage, but would receive a lower logical form alignment score.

Another type of scorer uses knowledge in triple stores, simple reasoning such as subsumption and disjointness in type taxonomies, geospatial, and temporal reasoning. Geospatial reasoning may be used to detect the presence or absence of spatial relations such as directionality, borders, and containment between geoentities. For example, if a question asks for an Asian city, then spatial containment provides evidence that Beijing is a suitable candidate, whereas Sydney is not. Similarly, geocoordinate information associated with entities is used to compute relative directionality (for example, California is SW of Montana; GW Bridge is N of Lincoln Tunnel, and so on).

Temporal reasoning may be used to detect inconsistencies between dates in the clue and those associated with a candidate answer. For example, the two most likely candidate answers generated by the system for the clue, "In 1594 he took a job as a tax collector in Andalusia," are "Thoreau" and "Cervantes." In this case, temporal reasoning is used to rule out Thoreau as he was not alive in 1594, having been born in 1817, whereas Cervantes, the correct answer, was born in 1547 and died in 1616.

The QA system of the present disclosure provides facility for absorbing a plurality of scorer algorithms, and for exploring their interactions and effects. To show how evidence is used to decide between competing candidate answers, scores are combined into an overall evidence profile. The evidence profile groups individual features into aggregate evidence dimensions that provide a more intuitive view of the feature group. Aggregate evidence dimensions might include, for example, Taxonomic, Geospatial (location), Temporal, Source Reliability, Gender, Name Consistency, Relational, Passage Support, Theory Consistency, and so on. Each aggregate dimension is a combination of related feature scores produced by the specific algorithms that fired on the gathered evidence.

Consider the following question: Chile shares its longest land border with this country. There may be two candidate answers produces by the system for this question: Argentina and Bolivia. Simple search engine scores favor Bolivia as an answer, due to a popular border dispute that was frequently reported in the news. The QA system of the present disclosure may prefer Argentina (the correct answer) over Bolivia, and the evidence profile shows why. Although Bolivia does have strong popularity scores, Argentina has strong support in the geospatial, passage support (for example, alignment and logical form graph matching of various text passages), and source reliability dimensions.

Final Merging and Ranking

Final ranking and merging 434 may evaluate the hundreds of hypotheses based on potentially hundreds of thousands of scores to identify the single best-supported hypothesis given the evidence and to estimate its confidence—the likelihood it is correct.

Answer Merging

Multiple candidate answers for a question may be equivalent despite very different surface forms. This is particularly confusing to ranking techniques that make use of relative differences between candidates. Without merging, ranking algorithms would be comparing multiple surface forms that represent the same answer and trying to discriminate among them. While one line of research has been proposed based on boosting confidence in similar candidates (Ko, J.; Nyberg, E.; and Luo Si, L. 2007. A Probabilistic Graphical Model for Joint Answer Ranking in Question Answering. In Proceedings of the 30th Annual International ACM SIGIR Conference, 343-350. New York: Association for Computing Machinery), the present disclosure observes that different surface forms are often disparately supported in the evidence and result in radically different, though potentially complementary, scores. An approach in one embodiment of the present disclosure merges answer scores before ranking and confidence estimation.

Using an ensemble of matching, normalization, and co-reference resolution algorithms, the QA system of the present disclosure in one embodiment identifies equivalent and related hypotheses (for example, Abraham Lincoln and Honest Abe) and then enables custom merging per feature to combine scores.

Ranking and Confidence Estimation

After merging, the system ranks the hypotheses and estimate confidence 438 based on their merged scores. In one embodiment of the present disclosure, a machine-learning approach may be adopted which may include running the system over a set of training questions with known answers and training a model 436 based on the scores. One could assume a very flat model and apply existing ranking algorithms (for example, Herbrich, R.; Graepel, T.; and Obermayer, K. 2000. Large Margin Rank Boundaries for Ordinal Regression. In Advances in Large Margin Classifiers, 115-132. Linköping, Sweden: Liu E-Press; Joachims, T. 2002. Optimizing Search Engines Using Clickthrough Data. In Proceedings of the Thirteenth ACM Conference on Knowledge Discovery and Data Mining (KDD). New York: Association for Computing Machinery) directly to these score profiles and use the ranking score for confidence.

For more intelligent ranking, however, ranking and confidence estimation may be separated into two phases. In both phases sets of scores may be grouped according to their domain (for example type matching, passage scoring, and so on.) and intermediate models trained using ground truths and methods specific for that task. Using these intermediate models, the system of the present disclosure produces an ensemble of intermediate scores. For instance, using hierarchical techniques such as mixture of experts (Jacobs, R.; Jordan, M. I.; Nowlan. S. J.; and Hinton, G. E. 1991. Adaptive Mixtures of Local Experts. Neural Computation 3(1): 79-87) and stacked generalization (Wolpert, D. H. 1992. Stacked Generalization. Neural Networks 5(2): 241-259), a meta-learner is trained over this ensemble. This approach allows for iteratively enhancing the system with more sophisticated and deeper hierarchical models while retaining flexibility for robustness and experimentation as scorers are modified and added to the system.

The QA system's meta-learner in one embodiment uses multiple trained models 436 to handle different question classes as, for instance, certain scores that may be crucial to identifying the correct answer for a factoid question may not be as useful on puzzle questions. A consideration in dealing with NLP-based scorers is that the features they produce may be quite sparse, and so accurate confidence estimation may involve the application of confidence-weighted learning techniques. See, e.g., Dredze, M.; Crammer, K.; and Pereira, F. 2008. Confidence-Weighted Linear Classification. In Proceedings of the Twenty-Fifth International Conference on Machine Learning (ICML). Princeton, N.J.: International Machine Learning Society.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for diffusing evidence among candidate answers during question answering, comprising:
   identifying, by a processor, a relationship between a first candidate answer and a second candidate answer, wherein the candidate answers are generated by a question-answering computer process for answering a question, the candidate answers have associated supporting evidence, and the candidate answers have associated confidence scores;
   determining whether to transfer the associated supporting evidence from the first candidate answer to the second candidate answer, or to transfer the associated supporting evidence from the second candidate answer to the first candidate answer, by analyzing how the question is posed and types of the first candidate answer and the second candidate answer;
   in response to determining to transfer the associated supporting evidence from the first candidate answer to the second candidate answer,
   transferring all or some of the evidence from the first candidate answer to the second candidate answer based on the identified relationship, and
   computing a new confidence score for the second candidate answer based on the transferred evidence and second candidate answer's existing evidence;
   in response to determining to transfer the associated supporting evidence from the second candidate answer to the first candidate answer,
   transferring all or some of the evidence from the second candidate answer to the first candidate answer based on the identified relationship, and
   computing a new confidence score for the first candidate answer based on the transferred evidence and first candidate answer's existing evidence.

2. The method of claim 1, wherein the transferring includes merging the transferred evidence with existing evidence information.

3. The method of claim 1, wherein the transferring includes adding new evidence information denoting direction or strength, or both direction and strength, of the identified relationship.

4. The method of claim 1, wherein the transferring includes transferring feature scores across candidates.

5. The method of claim 1, wherein transferring further includes determining based on heuristics whether to transfer entire feature score as-is, or a fraction of the feature score based on type and strength of the identified one or more relationships.

6. The method of claim 1, wherein the computing step is performed by machine learning.

7. The method of claim 1, wherein the identifying includes consulting a structured knowledge base and mapping strings appearing in the candidate answers.

8. The method of claim 1, wherein the identifying step is based on lexical knowledge extracted from unstructured text.

* * * * *